I. A. MACHAMER.
SAFETY MINE CAR BRAKE.
APPLICATION FILED AUG. 8, 1916.
1,214,341. Patented Jan. 30, 1917.
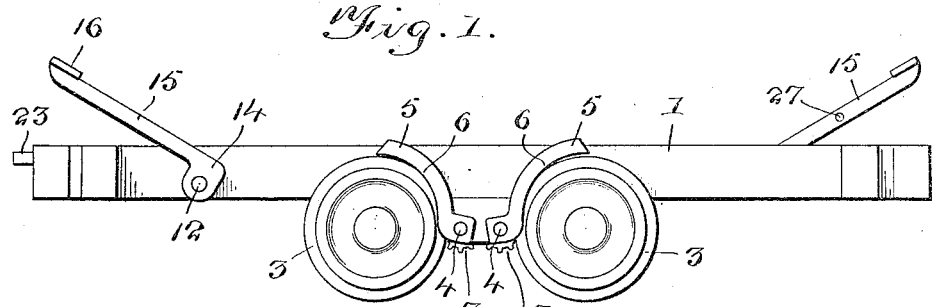
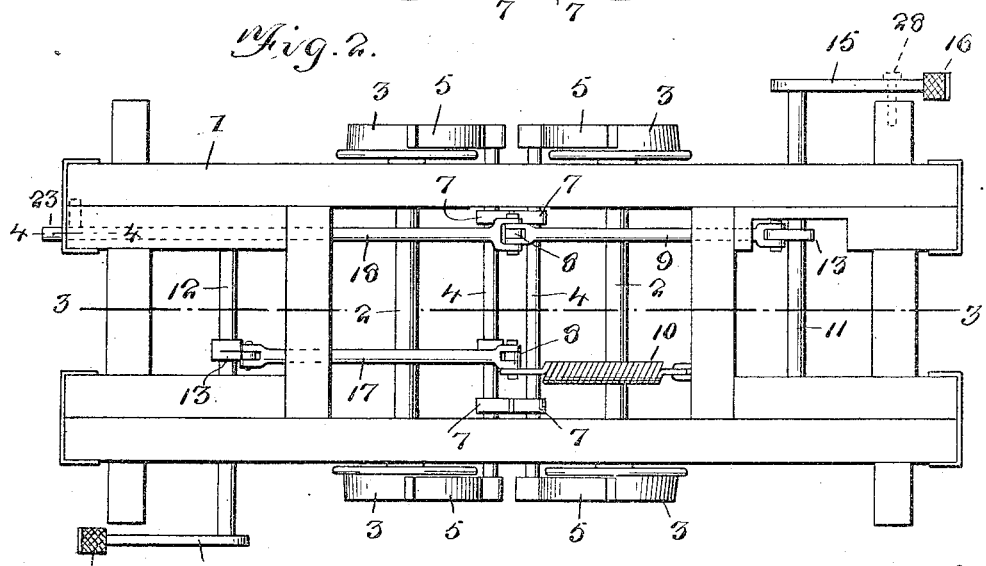
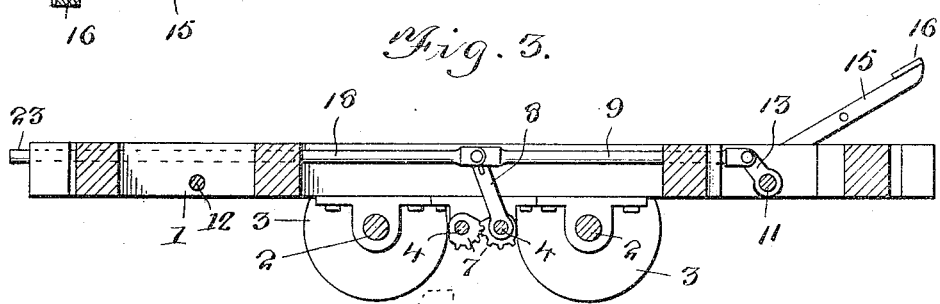
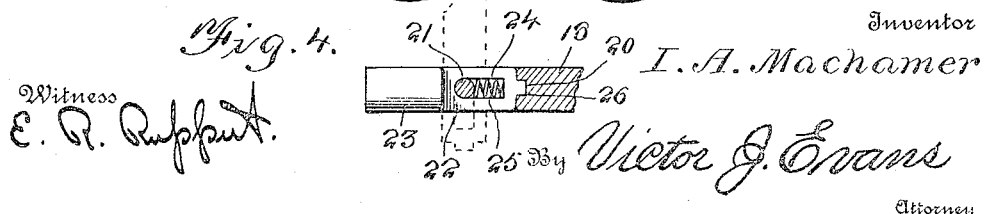
Inventor
I. A. Machamer
By Victor J. Evans
Attorney
Witness
E. R. Ruppert

UNITED STATES PATENT OFFICE.

ISAAC A. MACHAMER, OF WICONISCO, PENNSYLVANIA, ASSIGNOR OF ONE-HALF TO ANDREW BUDD, ALLEN BUDD, AND RICHARD BUDD, ALL OF WILLIAMSTOWN, PENNSYLVANIA.

SAFETY MINE-CAR BRAKE.

1,214,341.  Specification of Letters Patent.  Patented Jan. 30, 1917.

Application filed August 8, 1916.  Serial No. 113,791.

*To all whom it may concern:*

Be it known that I, ISAAC A. MACHAMER, a citizen of the United States, residing at Wiconisco, in the county of Dauphin and State of Pennsylvania, have invented new and useful Improvements in Safety Mine-Car Brakes, of which the following is a specification.

This invention relates to a safety appliance for mine cars, and is designed to provide means whereby a car can be easily and quickly halted by the driver thereof without necessitating the driver leaving the car and endangering his life or limb by applying the ordinary sprag between the spokes of the wheels of the car.

In carrying out my invention it is my purpose to provide a mine car with an arrangement of brake shoes designed to engage with the periphery of the wheels of the car when the said shoes are actuated, and to provide a novel construction of actuating means for the said shoes which includes lever members arranged adjacent to two of the diagonally opposite corners of the car convenient for operation by the driver of the car regardless of the direction of travel of the car, and to further provide the car with a projecting or buffer member that is connected with the brake actuating means, so that should one car contact with another the brakes will be automatically applied to halt the cars.

I accomplish the above results by a simple and novel arrangement of parts such as illustrated by the accompanying drawing, but it is to be understood that I am not to be restricted to the details of construction therein disclosed, but that I am entitled to all such changes in shape, form, proportion, etc., as fall within the scope of my claims.

In the drawing: Figure 1 is a side elevation of a mining car provided with my improvement, Fig. 2 is a top plan view of the frame or truck of the said car, Fig. 3 is a sectional view approximately on the line 3—3 of Fig. 2, and Fig. 4 is a detail sectional view approximately on the line 4—4 of Fig. 2.

In the drawing the numeral 1 designates the frame or truck of an ordinary mining car which has journaled thereon the usual transverse axles 2 carrying the usual wheels 3.

Between the axles 2, and arranged transversely of the car frame, I journal a pair of shafts 4—4, one of the shafts being disposed adjacent to each of the axles, the said shafts projecting beyond the sides of the car frame and each shaft has arranged upon its end a brake shoe 5. Each of these shoes is provided with an arcuate contacting face 6 disposed to engage one with the respective peripheries of the wheels, but normally retained slightly out of such contacting engagement by means which will presently be described.

Upon each of the shafts 4 inward of the side members of the car frame, I secure toothed segments 7—7, the same being arranged in pairs and the teeth of each pair intermeshing.

Upon each of the shafts 4 I arrange upstanding lugs 8, one of which receives the bifurcated end of a longitudinally disposed rod 9. Preferably the rod 9 is secured to the lug through the medium of a cotter pin, the said cotter pin being also engaged by one of the end convolutions of a helical spring 10, the opposite end of the said spring being secured to one of the transverse or cross beams of the car frame, and this spring, it will be noted, normally retains the brake shoes out of engagement with the peripheries of the wheels.

Journaled in suitable bearings adjacent to two of the diagonally opposite corners of the car frame are short shafts 11 and 12 respectively, each of the said shafts having an upstanding lug 13, and the lug 13 upon the shaft 11 receives the free and bifurcated end of the rod 9. The rod is preferably connected to the lug through the medium of a cotter pin, but, of course, other connecting means may be employed.

Each of the shafts, 11 and 12, project a suitable distance beyond the sides of the car frame, and to the said projecting ends of these shafts are secured the angular inner portions 14 of outwardly extending, normally horizontally disposed levers 15. By reference to the drawing it will be noted that each of the levers projects a suitable distance beyond one of the corners of the car frame and the said projecting ends are provided each with an inwardly extending laterally disposed flat offset 16, the same being in the nature of a plate and preferably having its upper face serrated or otherwise roughened, and the said offset members 16 provide, what may be termed, pedal members and the same are disposed in a convenient position to be operated by the foot of the driver of the car when the said car is traveling in either direction.

To the lug 8 of the second and remaining shaft 4 is secured, preferably through the medium of a cotter pin, the bifurcated end of a longitudinally disposed rod 17, the second and also bifurcated end of the said rod being similarly connected to the shaft shaft 12.

Arranged in suitable bearings upon the car frame and having its end passing through an opening in the front or one of the sills of the car frame is a rod 18, the inner end of the said rod being bifurcated and being connected, preferably through the referred to cotter pin, to the end of the rod 17 and to the lug 8 of the last mentioned shaft 4. It is to be understood that each of the cars is provided with an extending rod 18 and that the sills of the cars are provided with contact or buffer members which are disposed to receive the force of contact from the end of the rod 18 of the respective cars, should one or more of the cars, upon a grade or the like run into another car or cars, and it will be noted that such contact will rotate the shaft 4, to swing the toothed segments and to automatically apply the brakes.

There are instances in which a number of cars are adapted to be coupled together, and in such cases it would not do to have the brake rod projecting beyond the end of the car within the path of contact with the adjacent or coupled car. To provide for this I bifurcate the outer end of the rod 18 and provide the inner wall between the arms provided by the said bifurcation with a depression 20. Between the arms of the bifurcation I pivotally secure, as at 21, a lug or tongue 22, provided upon a rod extension 23. The pivot 21, it will be noted, passes through an elongated slot 24 in the tongue 22 and I arrange within the said slot a spring 25 which exerts a pressure between the end of the slot and the pivot 21. I also provide the end of the tongue 22 with a lug or stud 26 which is adapted to be received within the depression 20. By this means it will be noted that by pulling the extension 23 outwardly to permit of the lug 26 being drawn out of the depression 20, the said member 23 may be swung angularly to within a suitable depression or recess in one of the bumper members at the end of the car, as indicated by the dotted lines in both Figs. 3 and 4 of the drawings.

Also in some instances it is desirable that the brakes be applied for a considerable length of time to the wheels of the car and therefore I provide one or both of the levers 15 with a transverse slot 27 and the side or the end sill of the car with an opening which is designed to register with the said slot 27 when the lever is swung to its lower position and I pass through the slot 27, into the depression, a pin 28, indicated by the dotted lines in Fig. 2 of the drawings.

From the above description, taken in connection with the drawings it will be noted that I have provided a mining car with a safety appliance which may be readily operated by the driver of the car and which will be automatically operated should one car contact with another car. The improvement obviates the necessity of the driver or operator leaving the car to apply the brake bar commonly called the "sprag" between the spokes of the wheel and consequently overcomes the liability of fatalities frequently incident to such an operation, and furthermore it will be noted that the apparatus is of an extremely simple construction and is applicable, with only slight alterations, to any of the well known types of mining cars.

Having thus described the invention, what I claim is:

1. In a safety brake appliance for mining cars, the combination with a car, of brake members for the wheels of the car, operating shafts for said brake members, intermeshing elements for the shafts, spring means for the shafts for normally retaining the braking means out of wheel-engaging position, levers, means comprising mechanism between the levers and shafts for operating the shafts when the levers are actuated, a longitudinally extending rod for one of the shafts, an extension for the rod projecting outwardly of the car, means for normally sustaining the extension in alinement with the rod, means for permitting the extension being arranged angularly of the rod and retained in such position, and said extension providing a buffer member, whereby when contacted, to move the rod longitudinally and actuate the shaft to apply the brake means.

2. In a safety brake appliance for mining cars, the combination with the car, of laterally arranged spaced shafts journaled upon the car and having their ends projecting beyond the sides thereof, the wheel brake shoes having the rounded engaging faces, the toothed intermeshing segments upon the shafts, the short shafts journaled adjacent to two of the diagonal corners of the car, the operating levers for the short shafts having the inwardly extending pedals thereon, the rod connection between the short shafts and the first mentioned shafts, and the spring means for holding the shafts in one position to normally retain the brake shoes out of contact with the wheels of the car.

3. In a safety brake appliance for mining cars, the combination with the car, of two spaced shafts arranged transversely in journals upon the car, a brake shoe having a curved engaging face upon the ends of each of the shafts and disposed over the car wheels, intermeshing toothed segments on the shafts, lugs extending from the shafts, short shafts journaled in bearings adjacent to two of the diagonally opposite corners of the car and extending beyond the sides of the car, lugs upon the short shafts, rod members secured to the lugs of the short shafts and to the lugs of the first mentioned shafts, a lever having an offset end connected to the outer end of each of the short shafts and projecting beyond the end of the car, an offset member providing a pedal upon each of the levers, a buffer rod connected with the lug of one of the main shafts and having its free end extending beyond the end of the car, and spring means coöperating with one of the main shafts for normally holding the same in one position to retain the brake shoes out of engagement with the periphery of the wheels.

4. In a safety brake appliance for mining cars, the combination with a car, of arched brake shoes for the wheels of the car, shafts for the shoes, rod members connected with the shafts, diagonally disposed brake levers for the rods to actuate the same and rotate the shafts, intermeshing segments for the shafts, spring means for normally retaining the shafts in one position to sustain the brake shoes out of contact with the car wheels, a buffer rod extending longitudinally of the car and connected with one of the shafts, said buffer rod having its outer end bifurcated and the inner wall of the bifurcation provided with a depression, a rod extension including a tongue received in the bifurcation and the said extension projecting beyond the end of the car, said tongue having its inner end provided with a lug adapted to be received in the depression and having its side provided with an elongated opening, and a spring within the slot and exerting a tension between one of the walls thereof and the pivot to normally force the lug to within the depression.

In testimony whereof I affix my signature.

ISAAC A. MACHAMER.

Copies of this patent may be obtained for five cents each, by addressing the "Commissioner of Patents, Washington, D. C."